(12) United States Patent
Kim (10) Patent No.: US 9,701,215 B1
(45) Date of Patent: Jul. 11, 2017

(54) METHOD OF CONTROLLING BATTERY COOLING SYSTEM FOR VEHICLE

(71) Applicant: Hyundai Motor Company, Seoul (KR)

(72) Inventor: Jae Yeon Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/342,963

(22) Filed: Nov. 3, 2016

(30) Foreign Application Priority Data

Jun. 21, 2016 (KR) .......................... 10-2016-0077217

(51) Int. Cl.
*B60L 9/00* (2006.01)
*B60L 11/18* (2006.01)
*B60H 1/00* (2006.01)

(52) U.S. Cl.
CPC .......... *B60L 11/1874* (2013.01); *B60H 1/004* (2013.01); *B60H 1/00278* (2013.01); *B60L 11/1875* (2013.01); *B60L 11/1892* (2013.01); *B60L 11/1894* (2013.01)

(58) Field of Classification Search
CPC .. B60L 11/1874; B60H 1/00278; B60H 1/004
See application file for complete search history.

(56) References Cited

U.S. PATENT DOCUMENTS

| | | |
|---|---|---|
| 6,357,541 B1 | 3/2002 | Matsuda et al. |
| 6,705,101 B2 | 3/2004 | Brotz et al. |
| 7,147,071 B2 | 12/2006 | Gering et al. |
| 7,797,954 B2 | 9/2010 | Duhme et al. |
| 7,890,218 B2 | 2/2011 | Adams et al. |
| 7,975,757 B2 | 7/2011 | Nemesh et al. |
| 8,215,432 B2 | 7/2012 | Nemesh et al. |
| 8,402,776 B2 | 3/2013 | Johnston et al. |
| 2013/0074525 A1 | 3/2013 | Johnston et al. |
| 2013/0118707 A1 | 5/2013 | Kardos et al. |
| 2014/0033761 A1 | 2/2014 | Kawakami et al. |

(Continued)

FOREIGN PATENT DOCUMENTS

| | | |
|---|---|---|
| JP | 2002-352866 A | 12/2002 |
| JP | 2010-114063 A | 5/2010 |

(Continued)

*Primary Examiner* — Adam Alharbi
(74) *Attorney, Agent, or Firm* — Morgan Lewis & Bockius LLP (57) ABSTRACT

A method of controlling temperature of a battery module in a battery cooling system for a vehicle may include driving the vehicle, setting an electrical equipment cooling start temperature A', a coolant cooling start temperature B' of the battery module, and a refrigerant cooling start temperature B" of the battery module, detecting an electrical equipment temperature A and a battery module temperature B, determining whether the temperature B' is higher than the temperature B and is lower than the temperature B" and whether the temperature A is lower than the temperature A', and closing when the temperature B' is higher than the temperature B and is lower than the temperature B" and the temperature A is lower than the temperature A', each port of first and second valves, turning off operation of a second expansion valve, and terminating the control to prevent coolant from circulating to a cooler and the battery module.

11 Claims, 2 Drawing Sheets

(56) References Cited

U.S. PATENT DOCUMENTS

| | | |
|---|---|---|
| 2014/0060102 A1 | 3/2014 | Nemesh et al. |
| 2014/0165609 A1* | 6/2014 | Oh .................... F25B 21/02 62/3.61 |
| 2014/0216689 A1 | 8/2014 | Lombardo et al. |
| 2015/0110699 A1* | 4/2015 | Jung .................... C01B 33/113 423/325 |
| 2015/0165869 A1* | 6/2015 | Kim ................... B60H 1/00764 701/36 |

FOREIGN PATENT DOCUMENTS

| | | |
|---|---|---|
| KR | 10-2011-0101460 A | 9/2011 |
| KR | 10-1198816 B1 | 11/2012 |
| WO | WO 2012/013583 A1 | 2/2012 |

\* cited by examiner

METHOD OF CONTROLLING BATTERY COOLING SYSTEM FOR VEHICLE

CROSS-REFERENCE TO RELATED APPLICATION

The present application claims priority to Korean Patent Application No. 10-2016-0077217, filed Jun. 21, 2016, the entire contents of which is incorporated herein for all purposes by this reference.

BACKGROUND OF THE INVENTION

Field of the Invention

The present invention relates to a method of controlling a battery cooling system for a vehicle. More particularly, to a method of controlling a battery cooling system for a vehicle that cools a battery module by using coolant that exchanges heat with a refrigerant and interlocking an air-conditioner and a cooler in an electric vehicle or a hybrid vehicle.

Description of Related Art

In general, an air-conditioner for a vehicle includes an air-conditioner system that circulates a refrigerant in order to heat or air-condition the interior of the vehicle.

Such an air-conditioner may maintain a comfortable indoor environment by maintaining an indoor temperature of a vehicle to an appropriate temperature regardless of a temperature change of the outside, and in a process of circulating again a refrigerant that is discharged by driving a compressor to the compressor via a condenser, a receiver drier, an expansion valve, and an evaporator, the air-conditioner heats or air-conditions the interior of the vehicle by heat exchange by the evaporator.

That is, the air-conditioner condenses a high temperature and high pressure of vapor refrigerant that is compressed by a compressor through the condenser in an air-conditioning mode in summer and lowers a temperature and humidity of the interior through evaporation in the evaporator via the receiver drier and the expansion valve.

Nowadays, while interest in energy efficiency and an environment pollution problem increases, development of an environmentally-friendly vehicle that can substantially replace an internal combustion engine vehicle is required, and such an environmentally-friendly vehicle is classified into an electric vehicle that is driven using a fuel cell or electricity as a power source and a hybrid vehicle that is driven using an engine and a battery.

In an electric vehicle or a hybrid vehicle of such environmentally-friendly vehicles, unlike an air-conditioner of a general vehicle, a separate heater is not used and an air-conditioner that is applied to the environmentally-friendly vehicle is generally referred to as a heat pump system.

Here, an electric vehicle converts chemical reaction energy of oxygen and hydrogen to electrical energy to generate a driving torque, and in this process, thermal energy occurs by a chemical reaction within the fuel cell and it is essential in securing a performance of the fuel cell to effectively remove a generated heat.

Further, a hybrid vehicle generates a driving torque by driving a motor using electricity that is supplied from an electric battery or the fuel cell together with an engine operating with general fuel, and when effectively removing a heat occurring in a fuel cell, a battery, and a motor, a performance of the motor may be secured.

Accordingly, in a conventional hybrid vehicle or electric vehicle, in order to prevent a battery including a motor, an electrical equipment, and a fuel cell from being heated, a battery cooling system together with a cooler and a heat pump system should be formed with a separate close and seal circuit.

Therefore, there is a drawback that a size and weight of a cooling module that is disposed at the front side of the vehicle increase and that a layout of connection pipes that supply a refrigerant or coolant to each of a heat pump system, a cooler, and a battery cooling system at an engine compartment becomes complex.

Further, in order to enable a battery to exhibit an optimal performance, a battery cooling system that warms-up or cools the battery according to a vehicle status is separately provided, and a plurality of valves for connecting with each connection pipe are applied, and noise and vibration due to frequently opening and closing operation of the valves are transferred to the interior of the vehicle and ride comfort is thus deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling a battery cooling system for a vehicle having advantages of being capable of increasing an entire travel distance of the vehicle through efficient battery management by cooling a battery module with a water cooling method by selectively using a refrigerant and coolant that circulate an air-conditioner and a cooler in an electric vehicle or a hybrid vehicle.

According to various aspects of the present invention, a method of controlling a temperature of a battery module in a battery cooling system for a vehicle including an air-conditioner that is connected by a refrigerant line so as to circulate a refrigerant and comprising a first expansion valve, a cooler connected by a cooling line so as to circulate coolant to an electrical equipment, a battery module in which the cooling line and the battery cooling line are connected through a first valve having ports ⓐ, ⓑ and ⓒ to circulate coolant, and a chiller connected with the refrigerant line by a first connection line through a second expansion valve to supply coolant that selectively exchanges heat with a refrigerant to the battery module and that is connected with the battery cooling line by a second connection line through a second valve having ports ⓓ, ⓔ and ⓕ, may include driving the vehicle by starting, setting, by a controller, an electrical equipment cooling start temperature A', a coolant cooling start temperature B' of the battery module, and a refrigerant cooling start temperature B" of the battery module, detecting, by the controller, an electrical equipment temperature A and a battery module temperature B, determining, by the controller, whether the coolant cooling start temperature B' of the battery module is higher than the battery module temperature B and is lower than the refrigerant cooling start temperature B" of the battery module and whether the electrical equipment temperature A is lower than the electrical equipment cooling start temperature A', and closing, by the controller, when the coolant cooling start temperature B' of the battery module is higher than the battery module temperature B and is lower than the refrigerant cooling start temperature B" of the battery module and the electrical equipment temperature A is lower than the electrical equipment cooling start temperature A', each port of the first valve and the second valve, turning off operation of the second expansion valve, and terminating the control in order to prevent coolant from circulating to the cooler and the battery module.

The method may further include determining, by the controller, when the coolant cooling start temperature B' of the battery module is higher than the battery module temperature B and is not lower than the refrigerant cooling start temperature B" of the battery module and the electrical equipment temperature A is not lower than the electrical equipment cooling start temperature A', whether the battery module temperature B is higher than or equal to the coolant cooling start temperature B' and is lower than the refrigerant cooling start temperature B" and whether the electrical equipment temperature A is higher than or equal to the electrical equipment cooling start temperature A'.

The method may further include in the determining by the controller whether the battery module temperature B is higher than or equal to the coolant cooling start temperature B' and is lower than the refrigerant cooling start temperature B" and whether the electrical equipment temperature A is higher than or equal the electrical equipment cooling start temperature A', opening, by the controller, when the battery module temperature B is higher than or equal to the coolant cooling start temperature B' and is lower than the refrigerant cooling start temperature B" and the electrical equipment temperature A is higher than or equal the electrical equipment cooling start temperature A, the ports ⓐ, ⓑ, and ⓒ so as to supply coolant to the electrical equipment with connection of the cooling line and the battery cooling line, closing the port ⓔ of the second valve so as to close the second connection line, opening the ports ⓓ and ⓕ so as to connect the radiator and the battery module, and turning off operation of the second expansion valve, and detecting, by the controller, the electrical equipment temperature A, the battery module temperature B, and a temperature C of coolant that is discharged from the radiator.

The method may further include in the determining by the controller whether the battery module temperature B is higher than or equal to the coolant cooling start temperature B' and is lower than the refrigerant cooling start temperature B" and whether the electrical equipment temperature A is higher than or equal to the electrical equipment cooling start temperature A', determining, by the controller, when the battery module temperature B is not higher than or equal to the coolant cooling start temperature B' and is not lower than the refrigerant cooling start temperature B" and the electrical equipment temperature A is not higher than or equal to the electrical equipment cooling start temperature A, whether the refrigerant cooling start temperature B" is higher than the coolant cooling start temperature B' and is lower than or equal to the battery module temperature B and whether the electrical equipment temperature A is lower than the electrical equipment cooling start temperature A'.

The method may further include in the determining by the controller whether the refrigerant cooling start temperature B" is higher than the coolant cooling start temperature B' and is lower than or equal to the battery module temperature B and whether the electrical equipment temperature A is lower than the electrical equipment cooling start temperature A', closing, by the controller, when the refrigerant cooling start temperature B" is higher than the coolant cooling start temperature B' and is lower than or equal to the battery module temperature B and the electrical equipment temperature A is lower than the electrical equipment cooling start temperature A', the ports ⓐ, ⓑ, and ⓒ at the first valve in order to prevent coolant from circulating to the cooler, and opening the ports ⓓ and ⓔ and closing the port ⓕ at the second valve and turning on operation of the second expansion valve so as to open the second connection line while closing connection of the cooling line and the battery cooling line, and detecting, by the controller, the electrical equipment temperature A, the battery module temperature B, and a temperature C of coolant that is discharged from the radiator.

The method may further include in the determining by the controller whether the refrigerant cooling start temperature B" is higher than the coolant cooling start temperature B' and is lower than or equal to the battery module temperature B and whether the electrical equipment temperature A is lower than the electrical equipment cooling start temperature A', determining, by the controller, when the refrigerant cooling start temperature B" is not higher than the coolant cooling start temperature B' and is not lower than or equal to the battery module temperature B and the electrical equipment temperature A is not lower than the electrical equipment cooling start temperature A', whether the refrigerant cooling start temperature B" is higher than the coolant cooling start temperature B' and is lower than or equal to the battery module temperature B and whether the electrical equipment temperature A is higher than or equal to the electrical equipment cooling start temperature A'.

The method may further include in the determining by the controller whether the refrigerant cooling start temperature B" is higher than the coolant cooling start temperature B' and is lower than or equal to the battery module temperature B and whether the electrical equipment temperature A is higher than or equal to the electrical equipment cooling start temperature A', opening, by the controller, when the refrigerant cooling start temperature B" is higher than the coolant cooling start temperature B' and is lower than or equal to the battery module temperature B and the electrical equipment temperature A is higher than or equal to the electrical equipment cooling start temperature A', the ports ⓐ and ⓑ and closing the port ⓒ at the first valve so as to independently circulate coolant to the cooler, opening the ports ⓓ and ⓔ and closing the port ⓕ at the second valve and turning on operation of the second expansion valve so as to independently circulate coolant to the battery cooling line, and detecting, by the controller, the electrical equipment temperature A, the battery module temperature B, and a temperature C of coolant that is discharged from the radiator.

The method may further include in the determining by the controller whether the refrigerant cooling start temperature B" is higher than the coolant cooling start temperature B' and is lower than or equal to the battery module temperature B and whether the electrical equipment temperature A is higher than or equal to the electrical equipment cooling start temperature A', determining, by the controller, when the refrigerant cooling start temperature B" is not higher than the coolant cooling start temperature B' and is not lower than or equal to the battery module temperature B and the electrical equipment temperature A is not higher than or equal to the electrical equipment cooling start temperature A', whether the battery module temperature B is higher than or equal to the coolant cooling start temperature B' and is lower than the refrigerant cooling start temperature B" and whether the electrical equipment temperature A is lower than the electrical equipment cooling start temperature A'.

The method may further include in the determining by the controller whether the battery module temperature B is higher than or equal to the coolant cooling start temperature B' and is lower than the refrigerant cooling start temperature B″ and whether the electrical equipment temperature A is lower than the electrical equipment cooling start temperature A′, opening, by the controller, when the battery module temperature B is higher than or equal to the coolant cooling start temperature B′ and is lower than the refrigerant cooling start temperature B″ and the electrical equipment temperature A is lower than the electrical equipment cooling start temperature A′, the ports ⓐ and ⓒ so as to connect the cooling line and the battery cooling line, closing the port ⓑ so as not to supply coolant to the electrical equipment, closing the port ⓔ of the second valve so as to close the second connection line, and opening the ports ⓓ and ⓕ and turning off operation of the second expansion valve so as to connect the radiator and the battery module, and detecting, by the controller, the electrical equipment temperature A, the battery module temperature B, and a temperature C of coolant that is discharged from the radiator.

The cooler may include the radiator and the first water pump that are connected by the cooling line and selectively circulates coolant to a motor, an electric power controller (EPCU), and an On Board Charger (OBC).

At the battery cooling line, a second water pump may be provided between the battery module and the chiller.

As described above, in a method of controlling a battery cooling system for a vehicle according to various embodiments of the present invention, in an electric vehicle or a hybrid vehicle, by cooling a battery module with a water cooling method through heat exchange with coolant by selectively using a refrigerant that circulates an air-conditioner, the system can be simplified and an entire travel distance of the vehicle can increase through efficient battery management.

Further, when requesting to cool a battery module, by controlling the opening and closing control of each port that is provided in a valve and operation of an expansion valve that is connected with a chiller, a controller further lowers a temperature of coolant that is supplied to the battery module, thereby improving cooling efficiency.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
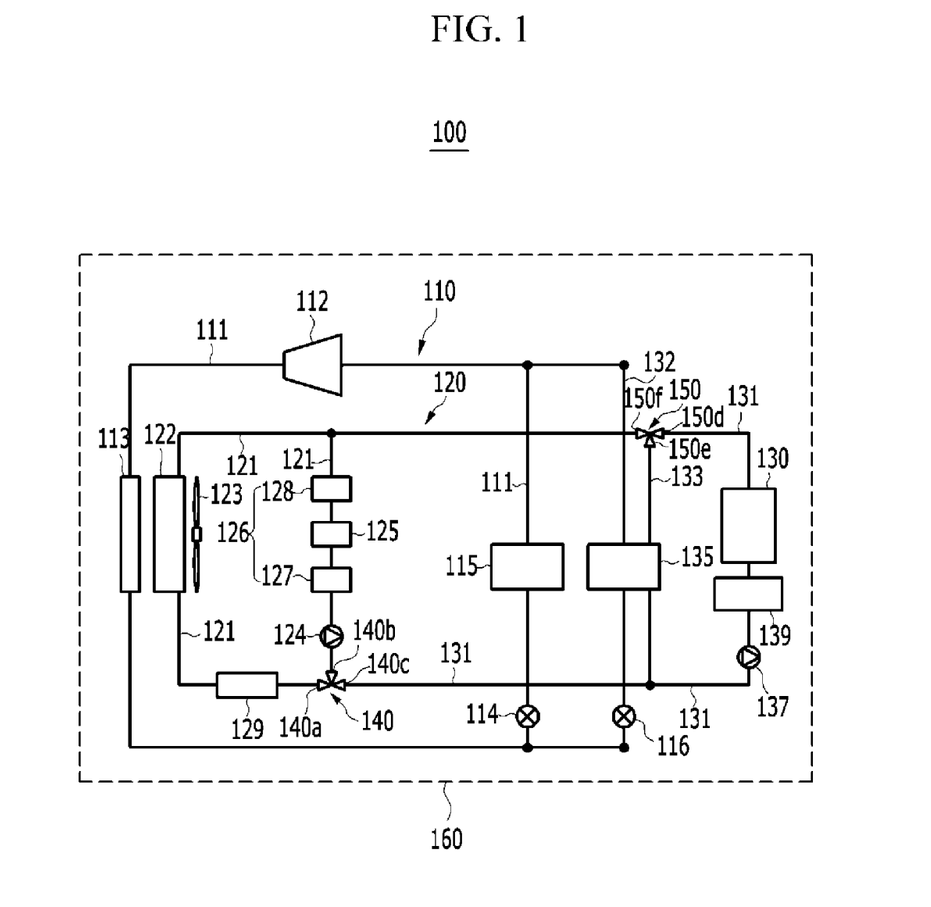
FIG. 1 is a block diagram illustrating a configuration of a battery cooling system for a vehicle to which a method of controlling a battery cooling system for a vehicle is applied according to various embodiments of the present invention.
Figure 2:
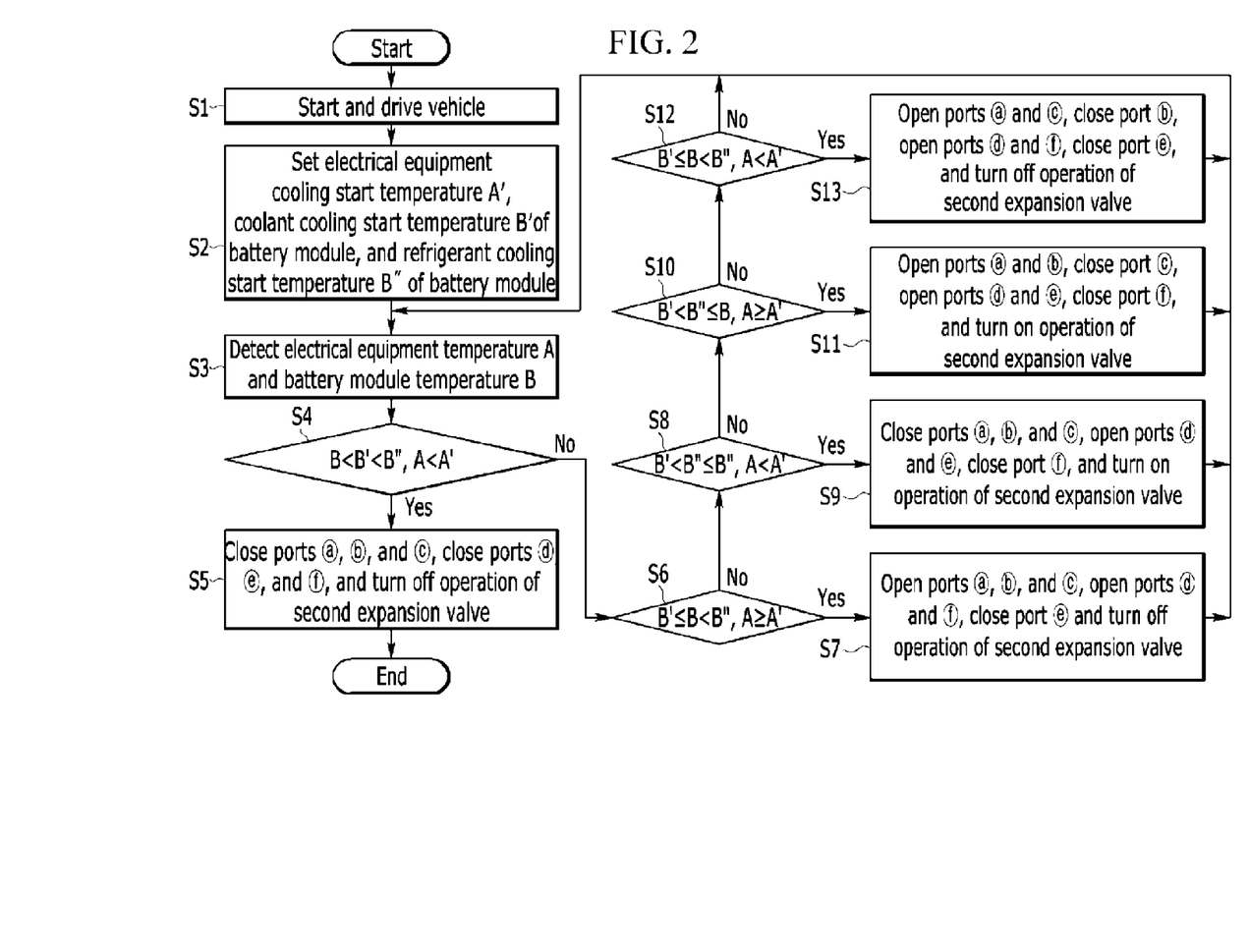
FIG. 2 is a control flowchart illustrating a method of controlling the battery cooling system for the vehicle according to various embodiments of the present invention.

FIG. 1 is a block diagram illustrating a configuration of a battery cooling system for a vehicle to which a method of controlling a battery cooling system for a vehicle is applied according to various embodiments of the present invention, and FIG. 2 is a control flowchart illustrating a method of controlling a battery cooling system for a vehicle according to various embodiments of the present invention.

Referring to FIG. 1, a method of controlling a battery cooling system for a vehicle according to various embodiments of the present invention may be applied to a hybrid vehicle or an electric vehicle together using an engine and a motor.

In such a hybrid vehicle or electric vehicle, a battery cooling system 100 is mutually interlocked with an air-conditioner 110, which is an air-conditioning device for air-conditioning or heating the interior of the vehicle and a cooler 120 for cooling a motor 125 and electrical equipment 126.

Here, the battery cooling system 100 may be connected with a controller 160 with Controller Area Network (CAN) communication.

The controller 160 may be a common electronic controller (ECU) that performs the entire control of electronic devices of the vehicle.

In various embodiments, the air-conditioner 110 includes a compressor 112, a condenser 113, a first expansion valve 114, and an evaporator 115 that are mutually connected through a refrigerant line 111.

When operating in an air-conditioning mode of the vehicle, such an air-conditioner 110 air-conditions the interior of the vehicle through circulation of a refrigerant.

The cooler 120 includes a radiator 122 and a first water pump 124 that are connected by a cooling line 121 and circulates coolant to cool the motor 125 and the electrical equipment 126.

Here, the electrical equipment 126 may include an electric power controller (EPCU) 127 that is provided on the cooling line 121 between the motor 125 and the first water pump 124 and an On Board Charger (OBC) 128 that is provided on the cooling line 121 between the motor 125 and the radiator 122.

The radiator 122 is disposed at the front side of the vehicle, and at the rear side thereof, a cooling fan 123 is provided, and coolant is cooled through operation of the cooling fan 123 and heat exchange with external air.

The cooler 120 having the above configuration circulates coolant that is cooled in the radiator 122 through operation of the first water pump 124 along the cooling line 121, thereby cooling the motor 125 and the electrical equipment 126 to prevent from being overheated.

Here, the battery cooling system 100 according to various embodiments of the present invention may include a battery module 130, a chiller 135, a second water pump 137, and a heater 139.

The battery module 130 supplies power to the motor 125 and the electrical equipment 126 and is connected with the cooler 120 through a battery cooling line 131.

Such a battery module 130 may be formed with a water cooling method that cools through coolant.

The chiller 135 is connected with the refrigerant line 111 of the air-conditioner 110 through a first connection line 132, is connected with the battery cooling line 131 through a second connection line 133, and enables coolant and a refrigerant that are injected therein to selectively exchange a heat, thereby adjusting a temperature of the coolant.

Here, in the first connection line 132, a second expansion valve 116 may be provided between the condenser 113 and the chiller 135.

When the vehicle operates in an air-conditioning mode, or when cooling the battery module 130 with a refrigerant, the second expansion valve 116 operates. Such a second expansion valve 116 expands a refrigerant that is injected through the first connection line 132 to inject the refrigerant into the chiller 135 in a low temperature state.

That is, by expanding a condensed refrigerant that is discharged from the condenser 113, in a state in which a temperature of the refrigerant is lowered, the second expansion valve 116 injects the refrigerant into the chiller 135 to further lower a temperature of coolant passing through the inside of the chiller 135. Accordingly, coolant whose temperature is lowered while passing through the chiller 135 is injected into the battery module 130, thereby more efficiently cooling the battery module 130.

The second water pump 137 is provided in the battery cooling line 131 between the battery module 130 and the chiller 135.

Such a second water pump 137 circulates coolant to the battery cooling line 131.

Here, the first water pump 124 and the second water pump 137 may be an electrodynamic water pump.

The heater 139 is provided in the battery cooling line 131 between the second water pump 137 and the battery module 130.

Here, upon warming up the battery module 130, the heater 139 is turned on to heat coolant circulating in the battery cooling line 131, thereby injecting the coolant into the battery module 130.

In various embodiments, a first valve 140 and a second valve 150 are provided in the battery cooling line 131.

The first valve 140 may connect the battery cooling line 131 that is connected with the cooling line 121 that connects the motor 125 and the electrical equipment 126 between the radiator 122 and the heater 139.

Here, the first valve 140 includes a port ⓐ 140a that is disposed at the radiator 122 side, a port ⓑ 140b that is disposed at the battery module 130 side, and a port ⓒ 140c that is disposed at the electrical equipment 126.

When cooling the battery module 130 using coolant, such a first valve 140 may connect the cooling line 121 and the battery cooling line 131 that are connected with the radiator 122, the motor 125, and the electrical equipment 126.

The second valve 150 may connect the second connection line 133 that is connected with the cooling line 121, the battery cooling line 131, and the chiller 135 between the battery module 130 and the radiator 122.

Here, the second valve 150 includes a port ⓓ 150d that is disposed at the battery module 130 side, a port ⓔ 150e that is disposed at the radiator 122 side, and a port ⓒ 140c that is disposed at the second connection line 133 side.

When cooling the battery module 130 using coolant, such a second valve 150 may close the second connection line 133 that is connected with the chiller 135.

Further, when cooling the battery module 130 using a refrigerant, the second valve 150 may close the cooling line 121 and connect the battery cooling line 131 and the second connection line 133.

The first valve 140 and the second valve 150 may be a 3-way valve.

A reservoir tank 129 may be provided in the cooling line 121 between the radiator 122 and the first valve 140.

The reservoir tank 129 may store coolant in which cooling is complete and that is injected from the radiator 122.

In various embodiments, the first water pump 124 is provided on the cooling line 121 between the first valve 140 and the EPCU 127, but the various embodiments of the present invention are not limited thereto and the first water pump 124 may be provided on the cooling line 121 between the first valve 140 and the reservoir tank 129.

When the first water pump 124 is provided between the reservoir tank 129 and the first valve 140, if the battery module 130 is cooled with coolant, while the first water pump 124 operates together with the second water pump 137, the first water pump 124 may increase a flow rate of coolant that is circulated to the battery module 130.

Here, in a method of controlling a battery cooling system according to an exemplary embodiment of the present invention, in the battery cooling system 100 having the foregoing configuration, by cooling the battery module 130 with a water cooling method by selectively using a refrigerant and coolant that circulate the air-conditioner 110 and the cooler 120, the battery module 130 is efficiently cooled.

For this reason, as shown in FIG. 2, in a method of controlling a battery cooling system for a vehicle according to various embodiments of the present invention, by starting the vehicle, the vehicle is driven (S1), and the controller 160 sets an electrical equipment cooling start temperature A', a coolant cooling start temperature B' of the battery module, and a refrigerant cooling start temperature B" of the battery module 130 (S2).

Thereafter, the controller 160 detects an electrical equipment temperature A and a battery module temperature B (S3).

When setting of a temperature and temperature detection of the electrical equipment 126 and the battery module 130 are complete, the controller 160 determines whether a coolant cooling start temperature B' of the battery module 130 is higher than the battery module temperature B and is lower than the refrigerant cooling start temperature B" of the battery module 130 and whether the electrical equipment temperature A is lower than the electrical equipment cooling start temperature A' (S4).

If a condition is satisfied at step S4, the controller 160 closes each of ports 140a, 140b, 140c, 150d, 150e, and 150f of the first valve 140 and the second valve 150 in order to prevent coolant from circulating to the cooler 120 and the battery module 130, turns off operation of the second expansion valve 116, and terminates the control (S5).

Here, the controller 160 stops operation of the first and second water pumps 124 and 137.

That is, when cooling of the motor 125, the electrical equipment 126, and the battery module 130 is not required, coolant is not circulated.

If a condition is not satisfied at step S4, the controller 160 determines whether the battery module temperature B is higher than or equal to the coolant cooling start temperature B' and is lower than the refrigerant cooling start temperature B" and whether the electrical equipment temperature A is higher than or equal to the electrical equipment cooling start temperature A' (S6).

If a condition is satisfied at step S6, in order to supply coolant to the motor 125 and the electrical equipment 126 with connection of the cooling line 121 and the battery cooling line 131, the controller 160 opens the ports ⓐ, ⓑ, and ⓒ 140a, 140b, and 140c. Further, in order to close the second connection line 133, the controller 160 closes a port ⓔ 150e of the second valve 150, and in order to connect the radiator 122 and the battery module 130, the controller 160 opens the ports ⓓ and ⓕ 150d and 150f. Simultaneously, the controller 160 turns off operation of the second expansion valve 116 (S7).

That is, at step S7, coolant that is cooled at the radiator 122 cools the motor 125, the electrical equipment 126, and the battery module 130. In this case, the controller 160 operates the first water pump 124 and the second water pump 137 to circulate coolant to the cooling line 121 and the battery cooling line 131.

When step S7 is complete, the process returns to step S3 of detecting the electrical equipment temperature A, the battery module temperature B, and a temperature C of coolant that is discharged from the radiator 122 and the controller 160 may repeatedly perform the foregoing each step.

If a condition is not satisfied at step S7, the controller 160 determines whether the refrigerant cooling start temperature B" is higher than the coolant cooling start temperature B' and is lower than or equal to the battery module temperature B and whether the electrical equipment temperature A is lower than the electrical equipment cooling start temperature A' (S8).

If a condition is satisfied at step S8, in order to prevent coolant from circulating to the cooler 120, the controller 160 closes the ports ⓐ, ⓑ, and ⓒ 140a, 140b, and 140c at the first valve 140. In order to open the second connection line 133 while closing a connection of the cooling line 121 and the battery cooling line 131, the controller 160 opens the ports ⓓ and ⓔ 150d and 150e and closes the port ⓕ 150f at the second valve 150. Simultaneously, the controller 160 turns on operation of the second expansion valve 116 (S9).

Accordingly, an expanded refrigerant is injected into the chiller 135 through operation of the second expansion valve 116.

That is, when the vehicle operates in an air-conditioning mode or when cooling the battery module 130 with a refrigerant, the second expansion valve 116 is operated by the controller 160. Such a second expansion valve 116 expands a refrigerant that is injected through the first connection line 132 to inject the refrigerant into the chiller 135 in a low temperature state.

In an air-conditioning mode of the vehicle, the refrigerant is circulated along the refrigerant line 111 through operation of the compressor 112 and is injected into the evaporator 115 through operation of the first expansion valve 114. A portion of the refrigerant is injected into the chiller 135 in an expanded state while passing through the operated second expansion valve 116 and exchanges a heat with coolant within the chiller 135.

In contrast, when an air-conditioning mode does not operate, the refrigerant is prevented from being injected into the evaporator 115 by the first expansion valve 114 in which operation is stopped. Accordingly, the refrigerant is injected into the chiller 135 in an expanded state while passing through the operated second expansion valve 116 and exchanges a heat with coolant within the chiller 135.

Here, in order to circulate coolant to the chiller 135, the controller 160 operates the second water pump 137.

That is, by expanding a condensed refrigerant that is discharged from the condenser 113, in a state in which a temperature of the refrigerant is lowered, the second expansion valve 116 injects the refrigerant into the chiller 135, thereby further lowering a water temperature of coolant passing through the inside of the chiller 135. Accordingly, coolant whose temperature is lowered while passing through the chiller 135 is injected into the battery module 130, thereby more efficiently cooling the battery module 130.

When step S9 is complete, the process returns to step S3 of detecting the electrical equipment temperature A, the battery module temperature B, and a temperature C of coolant that is discharged from the radiator and the controller 160 may repeatedly perform the foregoing each step.

If a condition is not satisfied at step S8, the controller 160 determines whether the refrigerant cooling start temperature B" is higher than the coolant cooling start temperature B' and is lower than or equal to the battery module temperature B and whether the electrical equipment temperature A is higher than or equal to the electrical equipment cooling start temperature A' (S10).

If a condition is satisfied at step S10, the controller 160 opens the ports ⓐ and ⓑ 140a and 140b at the first valve 140 in order to independently circulate coolant to the cooler 120 and closes the port ⓒ 140c in order to prevent from being connected with the battery cooling line 131. Further, the controller 160 opens the ports ⓓ and ⓔ 150d and 150e at the second valve 150 in order to independently circulate coolant to the battery cooling line 131 and closes the port ⓕ 150f in order to prevent from being connected with the cooling line 121. Simultaneously, the controller 160 turns on operation of the second expansion valve 116 (S11).

Accordingly, an expanded refrigerant is injected into the chiller 135 through operation of the second expansion valve 116.

When the vehicle operates in an air-conditioning mode or when cooling the battery module 130 with a refrigerant, the second expansion valve 116 is operated. Such a second expansion valve 116 expands a refrigerant that is injected through the first connection line 132 to inject the refrigerant into the chiller 135 in a low temperature state.

That is, by expanding the condensed refrigerant that is discharged from the condenser 113, in a state in which a temperature of the refrigerant is lowered, the second expansion valve 116 injects the refrigerant into the chiller 135, thereby further lowering a water temperature of coolant passing through the inside of the chiller 135. Accordingly, coolant whose water temperature is lowered while passing through the chiller 135 is injected into the battery module 130, thereby more efficiently cooling the battery module 130.

When step S11 is complete, the process returns to step S3 of detecting the electrical equipment temperature A, the battery module temperature B, and a temperature C of coolant that is discharged from the radiator and the controller 160 may repeatedly perform each of the foregoing steps.

If a condition is not satisfied at step S10, the controller 160 determines whether the battery module temperature B is higher than or equal to the coolant cooling start temperature B' and is lower than the refrigerant cooling start temperature B" and whether the electrical equipment temperature A is lower than the electrical equipment cooling start temperature A' (S12).

If a condition is satisfied at step S12, in order to connect the cooling line 121 and the battery cooling line 131, the controller 160 opens the ports ⓐ and ⓒ 140a and 140c and closes the port ⓑ 140b in order to prevent coolant from being supplied to the motor 125 and the electrical equipment 126. In order to close the second connection line 133, the controller 160 closes the port ⓔ 150e of the second valve 150. Further, in order to connect the radiator 122 and the battery module 130, the controller 160 opens the ports ⓓ and ⓕ 150d and 150f. Simultaneously, the controller 160 turns off operation of the second expansion valve 116 (S13).

That is, at step S13, coolant that is cooled at the radiator 122 cools the battery module 130, except for the motor 125 and the electrical equipment 126 that do not require cooling.

When step S13 is complete, the process returns to step S3 of detecting the electrical equipment temperature A, the battery module temperature B, and a temperature C of coolant that is discharged from the radiator and the controller 160 may repeatedly perform each of the foregoing steps.

As described above, when a method of controlling a battery cooling system for a vehicle according to various embodiments of the present invention is applied, the controller 160 cools the battery module 130 with a water-cooling method through heat exchange with coolant by selectively using a refrigerant that circulates the air-conditioner 110 in an electric vehicle or a hybrid vehicle and the system can be simplified and an entire travel distance of the vehicle can increase through efficient battery management.

Further, when cooling of the battery module 130 is requested, the controller 160 controls opening and closing of each of ports 140a, 140b, 140c 150d, 150e, and 150f that are provided in the first and second valves 140 and 150 and controls operation of the second expansion valve 116 that is connected with the chiller 135 to further lower a temperature of coolant that is supplied to the battery module 130, thereby improving cooling efficiency.

Further, a production cost can be reduced, a weight can be reduced, and space use can be improved through simplification of an entire system.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a temperature of a battery module in a battery cooling system for a vehicle comprising an air-conditioner that is connected by a refrigerant line to circulate a refrigerant and comprising a first expansion valve, a cooler connected by a cooling line to circulate coolant to an electrical equipment, a battery module in which the cooling line and the battery cooling line are connected through a first valve having ports ⓐ, ⓑ and ⓒ to circulate coolant, and a chiller connected with the refrigerant line by a first connection line through a second expansion valve to supply coolant that selectively exchanges heat with a refrigerant to the battery module and that is connected with the battery cooling line by a second connection line through a second valve having ports ⓓ, ⓔ and ⓕ, the method comprising:

driving the vehicle by starting;

setting, by a controller, an electrical equipment cooling start temperature A', a coolant cooling start temperature B' of the battery module, and a refrigerant cooling start temperature B" of the battery module;

detecting, by the controller, an electrical equipment temperature A and a battery module temperature B;

determining, by the controller, whether the coolant cooling start temperature B' of the battery module is higher than the battery module temperature B and is lower than the refrigerant cooling start temperature B" of the battery module and whether the electrical equipment temperature A is lower than the electrical equipment cooling start temperature A'; and closing, by the controller, when the coolant cooling start temperature B' of the battery module is higher than the battery module temperature B and is lower than the refrigerant cooling start temperature B" of the battery module and the electrical equipment temperature A is lower than the electrical equipment cooling start temperature A', each port of the first valve and the second valve, turning off operation of the second expansion valve, and terminating the control to prevent coolant from circulating to the cooler and the battery module.

2. The method of claim 1, further comprising:

determining, by the controller, when the coolant cooling start temperature B' of the battery module is higher than the battery module temperature B and is not lower than the refrigerant cooling start temperature B" of the battery module and the electrical equipment temperature A is not lower than the electrical equipment cooling start temperature A', whether the battery module temperature B is higher than or equal to the coolant cooling start temperature B' and is lower than the refrigerant cooling start temperature B" and whether the electrical equipment temperature A is higher than or equal to the electrical equipment cooling start temperature A'.

3. The method of claim 2, further comprising:

in the determining by the controller whether the battery module temperature B is higher than or equal to the coolant cooling start temperature B' and is lower than the refrigerant cooling start temperature B" and whether the electrical equipment temperature A is higher than or equal the electrical equipment cooling start temperature A', opening, by the controller, when the battery module temperature B is higher than or equal to the coolant cooling start temperature B' and is lower than the refrigerant cooling start temperature B" and the electrical equipment temperature A is higher than or equal the electrical equipment cooling start temperature A, the ports ⓐ, ⓑ, and ⓒ to supply coolant to the electrical equipment with connection of the cooling line and the battery cooling line, closing the port ⓔ of the second valve to close the second connection line, opening the ports ⓓ and ⓕ to connect the radiator and the battery module, and turning off operation of the second expansion valve; and detecting, by the controller, the electrical equipment temperature A, the battery module temperature B, and a temperature C of coolant that is discharged from the radiator.

4. The method of claim 2, further comprising:
in the determining by the controller whether the battery module temperature B is higher than or equal to the coolant cooling start temperature B' and is lower than the refrigerant cooling start temperature B" and whether the electrical equipment temperature A is higher than or equal to the electrical equipment cooling start temperature A',
determining, by the controller, when the battery module temperature B is not higher than or equal to the coolant cooling start temperature B' and is not lower than the refrigerant cooling start temperature B" and the electrical equipment temperature A is not higher than or equal to the electrical equipment cooling start temperature A, whether the refrigerant cooling start temperature B" is higher than the coolant cooling start temperature B' and is lower than or equal to the battery module temperature B and whether the electrical equipment temperature A is lower than the electrical equipment cooling start temperature A'.

5. The method of claim 4, further comprising:
in the determining by the controller whether the refrigerant cooling start temperature B" is higher than the coolant cooling start temperature B' and is lower than or equal to the battery module temperature B and whether the electrical equipment temperature A is lower than the electrical equipment cooling start temperature A',
closing, by the controller, when the refrigerant cooling start temperature B" is higher than the coolant cooling start temperature B' and is lower than or equal to the battery module temperature B and the electrical equipment temperature A is lower than the electrical equipment cooling start temperature A', the ports ⓐ, ⓑ, and ⓒ at the first valve to prevent coolant from circulating to the cooler, and opening the ports ⓓ and ⓔ and closing the port ⓕ at the second valve and turning on operation of the second expansion valve to open the second connection line while closing connection of the cooling line and the battery cooling line, and
detecting, by the controller, the electrical equipment temperature A, the battery module temperature B, and a temperature C of coolant that is discharged from the radiator.

6. The method of claim 4, further comprising:
in the determining by the controller whether the refrigerant cooling start temperature B" is higher than the coolant cooling start temperature B' and is lower than or equal to the battery module temperature B and whether the electrical equipment temperature A is lower than the electrical equipment cooling start temperature A,
determining, by the controller, when the refrigerant cooling start temperature B" is not higher than the coolant cooling start temperature B' and is not lower than or equal to the battery module temperature B and the electrical equipment temperature A is not lower than the electrical equipment cooling start temperature A', whether the refrigerant cooling start temperature B" is higher than the coolant cooling start temperature B' and is lower than or equal to the battery module temperature B and whether the electrical equipment temperature A is higher than or equal to the electrical equipment cooling start temperature A'.

7. The method of claim 6, further comprising:
in the determining by the controller whether the refrigerant cooling start temperature B" is higher than the coolant cooling start temperature B' and is lower than or equal to the battery module temperature B and whether the electrical equipment temperature A is higher than or equal to the electrical equipment cooling start temperature A',
opening, by the controller, when the refrigerant cooling start temperature B" is higher than the coolant cooling start temperature B' and is lower than or equal to the battery module temperature B and the electrical equipment temperature A is higher than or equal to the electrical equipment cooling start temperature A', the ports ⓐ and ⓑ and closing the port ⓒ at the first valve to independently circulate coolant to the cooler, opening the ports ⓓ and ⓔ and closing the port ⓕ at the second valve and turning on operation of the second expansion valve to independently circulate coolant to the battery cooling line, and
detecting, by the controller, the electrical equipment temperature A, the battery module temperature B, and a temperature C of coolant that is discharged from the radiator.

8. The method of claim 6, further comprising:
in the determining by the controller whether the refrigerant cooling start temperature B" is higher than the coolant cooling start temperature B' and is lower than or equal to the battery module temperature B and whether the electrical equipment temperature A is higher than or equal to the electrical equipment cooling start temperature A',
determining, by the controller, when the refrigerant cooling start temperature B" is not higher than the coolant cooling start temperature B' and is not lower than or equal to the battery module temperature B and the electrical equipment temperature A is not higher than or equal to the electrical equipment cooling start temperature A', whether the battery module temperature B is higher than or equal to the coolant cooling start temperature B' and is lower than the refrigerant cooling start temperature B" and whether the electrical equipment temperature A is lower than the electrical equipment cooling start temperature A'.

9. The method of claim 8, further comprising:
in the determining by the controller whether the battery module temperature B is higher than or equal to the coolant cooling start temperature B' and is lower than the refrigerant cooling start temperature B" and whether the electrical equipment temperature A is lower than the electrical equipment cooling start temperature A',
opening, by the controller, when the battery module temperature B is higher than or equal to the coolant cooling start temperature B' and is lower than the refrigerant cooling start temperature B" and the electrical equipment temperature A is lower than the electrical equipment cooling start temperature A', the ports ⓐ and ⓒ to connect the cooling line and the battery cooling line, closing the port ⓑ so as not to supply coolant to the electrical equipment, closing the port ⓔ of the second valve to close the second connection line, and opening the ports ⓓ and ⓕ and turning off operation of the second expansion valve to connect the radiator and the battery module, and detecting, by the controller, the electrical equipment temperature A, the battery module temperature B, and a temperature C of coolant that is discharged from the radiator.

10. The method of claim 1, wherein the cooler comprises the radiator and the first water pump that are connected by the cooling line and selectively circulates coolant to a motor, an electric power controller (EPCU), and an On Board Charger (OBC).

11. The method of claim 1, wherein at the battery cooling line, a second water pump is provided between the battery module and the chiller.

\* \* \* \* \*